United States Patent
Ying et al.

(10) Patent No.: US 10,863,356 B2
(45) Date of Patent: Dec. 8, 2020

(54) COMMUNICATIONS METHOD, APPARATUS, AND SYSTEM

(71) Applicant: HUAWEI TECHNOLOGIES CO., LTD., Shenzhen (CN)

(72) Inventors: Jiangwei Ying, Beijing (CN); Qi Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 16/140,550

(22) Filed: Sep. 25, 2018

(65) Prior Publication Data

US 2019/0028897 A1 Jan. 24, 2019

Related U.S. Application Data

(63) Continuation of application No. PCT/CN2016/077371, filed on Mar. 25, 2016.

(51) Int. Cl.
*H04W 12/08* (2009.01)
*H04W 4/40* (2018.01)
(Continued)

(52) U.S. Cl.
CPC ............ *H04W 12/08* (2013.01); *H04L 29/06* (2013.01); *H04L 67/12* (2013.01); *H04W 4/40* (2018.02);
(Continued)

(58) Field of Classification Search
CPC ................. H04W 12/08; H04W 74/04; H04W 12/00503; H04W 12/00518; H04W 76/11;
(Continued)

(56) References Cited

U.S. PATENT DOCUMENTS 10,321,353 B2* 6/2019 Kim .................. H04W 4/40
10,433,356 B2* 10/2019 Feng .................. H04W 40/10
(Continued)

FOREIGN PATENT DOCUMENTS

CN 102087786 A 6/2011
CN 104737572 A 6/2015
(Continued)

OTHER PUBLICATIONS

Huawei, HiSilicon, Key issue of authorization of LTE-V2X service in the MNO network, 3GPP TSG SA WG3 (Security) Meeting #82 S3-160093, Feb. 1 to 5, 2016, Dubrovnik, Croatia (Year: 2016).*
(Continued)

*Primary Examiner* — Mounir Moutaouakil
(74) *Attorney, Agent, or Firm* — Kilpatrick Townsend & Stockton LLP

(57) ABSTRACT

A communications method, apparatus, and system are disclosed. The method includes: generating, by an access device, a temporary identity sequence for a terminal, and sending a first message carrying the temporary identity sequence to the terminal; receiving, by the terminal, the first message sent by the access device, selecting one temporary identity from the temporary identity sequence, and generating, based on an area key of the terminal, the selected temporary identity, and a PDCP data SDU of the terminal, a PDCP data PDU of the terminal, which is used when a V2X message of the terminal is sent, where the area key is an area key of an area corresponding to location information of the terminal. This can implement security requirements of anonymity, non-traceability, and non-repudiation of V2X communication, and reduce security overheads and a processing delay of the V2X communication.

13 Claims, 11 Drawing Sheets

(51) Int. Cl.
  *H04W 74/04*    (2009.01)
  *H04L 29/06*    (2006.01)
  *H04W 12/00*    (2009.01)
  *H04L 29/08*    (2006.01)
  *H04W 76/11*    (2018.01)
  *H04W 8/26*     (2009.01)
  *H04W 12/04*    (2009.01)
  *H04W 80/08*    (2009.01)

(52) U.S. Cl.
  CPC ....... *H04W 8/26* (2013.01); *H04W 12/00503* (2019.01); *H04W 12/00518* (2019.01); *H04W 12/04* (2013.01); *H04W 74/04* (2013.01); *H04W 76/11* (2018.02); *H04W 80/08* (2013.01)

(58) Field of Classification Search
  CPC ....... H04W 8/26; H04W 12/04; H04W 80/08; H04W 4/40; H04L 29/06; H04L 67/12
  See application file for complete search history.

(56) References Cited

U.S. PATENT DOCUMENTS

| | | | | |
|---|---|---|---|---|
| 10,484,866 B2* | 11/2019 | Huang | .................... | H04W 4/00 |
| 2013/0124710 A1* | 5/2013 | Kato | .................... | H04W 8/205 |
| | | | | 709/223 |
| 2014/0119544 A1 | 5/2014 | Lee | | |
| 2014/0120878 A1* | 5/2014 | Sato | .................... | H04W 12/08 |
| | | | | 455/411 |
| 2016/0212108 A1* | 7/2016 | Stojanovski | .... | H04W 12/04031 |
| 2017/0171690 A1 | 6/2017 | Kim et al. | | |
| 2019/0045507 A1* | 2/2019 | Sorrentino | ............ | H04W 76/14 |
| 2019/0075447 A1* | 3/2019 | Lee | ............ | H04W 8/20 |
| 2019/0116608 A1* | 4/2019 | Kim | .................... | H04W 72/04 |

FOREIGN PATENT DOCUMENTS

| | | |
|---|---|---|
| CN | 104955162 A | 9/2015 |
| WO | 2015147765 A2 | 10/2015 |
| WO | 2016013826 A1 | 1/2016 |

OTHER PUBLICATIONS

3GPP TR 33.833 V1.7.0 (Feb. 2016),3rd Generation Partnership Project;Technical Specification Group Services and System Aspects;Study on Security issues to support Proximity Services(ProSe)(Release 13),total 237 pages.

S3-160092 Huawei, HiSilicon, "Security framework for V2V communication"-revision of S3-16abcd.3GPP TSG SA WG3 (Security) Meeting #82,Feb. 1 to 5, 2016, Dubrovnik, Croatia,total 4 pages.

* cited by examiner

| LTE V2X temporary identity | Area identity | Area key identifier | Timestamp | Data payload (encrypted) | Message authentication code |

FIG. 3A

| LTE V2X temporary identity | Area identity | Area key identifier | Timestamp | Data payload (unencrypted) | Message authentication code |

FIG. 3B

COMMUNICATIONS METHOD, APPARATUS, AND SYSTEM

CROSS-REFERENCE TO RELATED APPLICATIONS

This application is a continuation of International Application No. PCT/CN2016/077371, filed on Mar. 25, 2016, the disclosure of which is hereby incorporated by reference in its entirety.

TECHNICAL FIELD

The present invention relates to the field of communications technologies, and in particular, to a communications method, apparatus, and system.

BACKGROUND

In recent years, the vehicle network draws more people's attention. Security and reliability of road transportation may be improved, and traffic efficiency may be improved through communication between vehicles or communication between a vehicle and a roadside unit (RSU). Intelligent Transport System implements continuous communication between vehicles, a vehicle and a person, or a vehicle and a road to obtain a current vehicle state or an ambient environment state, so as to reduce traffic accidents, improve transportation security, help reduce traffic jams, reduce energy consumption, and reduce pollution emission, thereby protecting the environment, improving transportation efficiency, and driving related industries.

In the Intelligent Transport System (ITS), there are three important security requirements for vehicle to everything (V2X) communication: anonymity, that is, a message sender is anonymous for protecting information of the message sender; non-traceability, that is, protecting the message sender from being traced; and non-repudiation, that is, preventing the message sender from repudiating a message sent by the message sender. Currently, the ITS of Europe and the ITS of America implement V2X communication based on a dedicated short range communication (DSRC) technology. In this system, security of the V2X communication depends on a PKI certificate system, and the three security requirements of V2X are implemented based on a certificate. A V2X communications terminal requests certificates from a Certificate Authority (CA) of a network side. The V2X communications terminal needs to constantly replace certificates from being traced, and a frequency may reach one time every six minutes. Therefore, the V2X communications terminal needs massive certificates. In addition, because of a limited quantity of RSUs in the DSRC system, the V2X communications terminal may apply, to the CA at a time, for certificates to be used for a month, and the quantity of the certificates may reach a magnitude of 7200. After obtaining the certificates, the V2X communications terminal locally caches the certificates. The terminal may broadcast, at a frequency of 1-10 HZ, a V2X message that carries information (for example, cooperative awareness message (CAM) and decentralized environmental notification message (DENM)) of the terminal. A sending terminal needs to carry a certificate in a message, so that a receiving terminal can verify legality of an identity of the terminal. The certificate performs anonymization processing on the sending terminal, that is, a subject name in the certificate only has a mapping relationship with the sending terminal and is stored in the CA, and the subject name may not disclose basic information of the sending terminal. The sending terminal needs to use a private key corresponding to the certificate to sign the message, and carry a signature value in the message, so that the receiving terminal can verify whether the CAM/DENM encounters a security attack (forgery or tampering). In addition, the signature also ensures implementation of the non-repudiation. The receiving terminal may first verify legality of the certificate in the CAM/DENM, and then verifies whether the signature value in the message is correct. For a format of a V2X message, refer to FIG. 1. A certificate and a signature need to be carried in the message.

However, anonymity, non-traceability, and non-repudiation implemented in the V2X communication solution based on the DSRC technology are implemented based on the certificates. Each DSRC message carries a certificate and a signature, and a size of the certificate and a size of the signature are far greater than a size of the DSRC message, which causes high overheads. In addition, a signature time and an encryption computing time of the certificate are long, and consequently an extremely high processing delay may have a relatively great impact on a V2X communication message that is sensitive to a delay.

SUMMARY

Embodiments of the present invention provide a communications method, apparatus, and system, to implement requirements of anonymity, non-traceability, and non-repudiation in V2X communication by using an LTE network, so as to reduce security overheads and a processing delay.

According to a first aspect, a communications method is provided, including:
  receiving, by a terminal, a first message sent by an access device, where the first message carries a temporary identity sequence generated by the access device for the terminal; and
  selecting, by the terminal, one temporary identity from the temporary identity sequence, and generating, based on an area key of the terminal, the selected temporary identity, and a PDCP data SDU of the terminal, a PDCP data PDU of the terminal, where the area key is an area key of an area corresponding to location information of the terminal.

In this way, the terminal carries the temporary identity in each subsequent V2X message, and an anonymity security requirement of V2X communication can be implemented based on the temporary identity.

On the basis of the first aspect, optionally, before the receiving, by a terminal, a first message sent by an access device, the method further includes:
  sending, by the terminal, a second message that is used to obtain the temporary identity sequence of the terminal to the access device, where the second message carries an identity of the terminal.

On the basis of the first aspect, optionally, when the access device is a vehicle to everything V2X server, the second message is a temporary identity request message, and the first message is a temporary identity response message.

On the basis of the first aspect, optionally, when the access device is a V2X server, the second message is a service authorization request message, and the first message is a service authorization response message.

On the basis of the first aspect, optionally, when the access device is a V2X server or an eNB, the second message is a communication security parameter request message, and the first message is a communication security parameter response message.

On the basis of the first aspect, optionally, when the access device is an eNB, the second message is a radio resource request message, and the first message is a radio resource response message.

On the basis of the first aspect, optionally, the PDCP data PDU includes a PDCP header, a data payload, and a message authentication code, where: the PDCP header carries the selected temporary identity, an area identity of the area corresponding to the location information of the terminal, an identity of the area key, and a timestamp at which the terminal processes the PDCP data SDU; the data payload is data content of an encrypted PDCP data SDU for V2X communication that needs to be encrypted, and is used to describe state information of the terminal; and the message authentication code is obtained by using the area key to perform integrity protection on the PDCP header and the data payload.

According to a second aspect, a communications method is provided, including:

generating, by an access device, a temporary identity sequence for a terminal; and sending, by the access device, a first message carrying the temporary identity sequence to the terminal.

In this way, the temporary identity sequence is generated and distributed to the terminal by the access device on a network side, and an anonymity requirement of V2X communication is implemented.

On the basis of the second aspect, optionally, the access device is a vehicle to everything V2X server or an evolved NodeB eNB.

On the basis of the second aspect, optionally, the generating, by an access device, a temporary identity sequence for a terminal includes:

generating, by the access device, the temporary identity sequence for the terminal, and setting a lifetime for each temporary identity in the temporary identity sequence.

On the basis of the second aspect, optionally, before the generating, by an access device, a temporary identity sequence for a terminal, the method further includes:

receiving, by the access device, a second message that is sent by the terminal and that is used to obtain the temporary identity sequence of the terminal, where the second message carries an identity of the terminal;

checking, by the access device, whether the terminal has authorization permission for V2X communication; and determining, by the access device, that the terminal has the authorization permission.

On the basis of the second aspect, optionally, the checking, by the access device, whether the terminal has authorization permission for V2X communication includes:

obtaining, by the access device, V2X authorization information of the terminal, and performing an authorization check on the terminal based on the V2X authorization information of the terminal, including: determining, by the access device based on the identity of the terminal, whether the terminal is allowed to perform a V2X service, where the V2X authorization information of the terminal is locally stored in the access device or stored in a home subscriber server HSS.

On the basis of the second aspect, optionally, when the access device is a V2X server, the second message is a temporary identity request message, and the first message is a temporary identity response message.

On the basis of the second aspect, optionally, when the access device is a V2X server, the second message is a service authorization request message, and the first message is a service authorization response message.

On the basis of the second aspect, optionally, when the access device is a V2X server or an eNB, the second message is a communication security parameter request message, and the first message is a communication security parameter response message.

On the basis of the second aspect, optionally, when the access device is an eNB, the second message is a radio resource request message, and the first message is a radio resource response message.

On the basis of the second aspect, optionally, before the generating, by an access device, a first temporary identity sequence for a terminal, the method further includes:

checking, by the access device, an available temporary identity that exists in the temporary identity sequence sent to the terminal last time, where the available temporary identity is a temporary identity with an unexpired lifetime.

On the basis of the second aspect, optionally, the first message is a temporary identity notification message.

On the basis of the second aspect, optionally, the generating, by an access device, a temporary identity sequence for a terminal includes:

generating, by the access device, the temporary identity sequence for the terminal, and setting a lifetime for each temporary identity in the temporary identity sequence.

According to a third aspect, a communications apparatus is provided, including:

a receiving unit, configured to receive a first message sent by an access device, where the first message carries a temporary identity sequence generated by the access device for the apparatus; and a processing unit, configured to: select one temporary identity from the temporary identity sequence; and generate, based on an area key of the apparatus, the selected temporary identity, and a PDCP data SDU of the apparatus, a PDCP data PDU of the apparatus, where the area key is an area key of an area corresponding to location information of the apparatus.

In this way, the terminal carries the temporary identity in each subsequent V2X message, and an anonymity security requirement of V2X communication can be implemented based on the temporary identity.

On the basis of the third aspect, optionally, before receiving the first message sent by the access device, the receiving unit is further configured to:

send a second message that is used to obtain the temporary identity sequence of the apparatus to the access device, where the second message carries an identity of the apparatus.

On the basis of the third aspect, optionally, when the access device is a vehicle to everything V2X service unit, the second message is a temporary identity request message, and the first message is a temporary identity response message.

On the basis of the third aspect, optionally, when the access device is a V2X service unit, the second message is a service authorization request message, and the first message is a service authorization response message.

On the basis of the third aspect, optionally, when the access device is a V2X service unit or an eNB, the second message is a communication security parameter request message, and the first message is a communication security parameter response message.

On the basis of the third aspect, optionally, when the access device is an eNB, the second message is a radio resource request message, and the first message is a radio resource response message.

On the basis of the third aspect, optionally, the PDCP data PDU includes a PDCP header, a data payload, and a message authentication code, where: the PDCP header carries the selected temporary identity, an area identity of the area corresponding to the location information of the apparatus, an identity of the area key, and a timestamp at which the apparatus processes the PDCP data SDU; the data payload is data content of an encrypted PDCP data SDU for V2X communication that needs to be encrypted, and is used to describe state information of the apparatus; and the message authentication code is obtained by using the area key to perform integrity protection on the PDCP header and the data payload.

According to a fourth aspect, a communications apparatus is provided, applied to a network side and including:
 a processing unit, configured to generate a temporary identity sequence for a terminal; and
 a sending unit, configured to send a first message carrying the temporary identity sequence to the terminal.

In this way, the temporary identity sequence is generated and distributed to the terminal by the access device on the network side, and an anonymity requirement of V2X communication is implemented.

On the basis of the fourth aspect, optionally, when generating the temporary identity sequence for the terminal, the processing unit is specifically configured to:
 generate the temporary identity sequence for the terminal, and set a lifetime for each temporary identity in the temporary identity sequence.

On the basis of the fourth aspect, optionally, the apparatus further includes:
 a receiving unit, configured to: before the processing unit generates the temporary identity sequence for the terminal, receive a second message that is sent by the terminal and that is used to obtain the temporary identity sequence of the terminal, where the second message carries an identity of the terminal; where
 the processing unit is further configured to check whether the terminal has authorization permission for V2X communication.

On the basis of the fourth aspect, optionally, when checking whether the terminal has the authorization permission for the V2X communication, the processing unit is specifically configured to:
 obtain V2X authorization information of the terminal, and perform an authorization check on the terminal based on the V2X authorization information of the terminal, including: determining, based on the identity of the terminal, whether the terminal is allowed to perform a V2X service, where the V2X authorization information of the terminal is locally stored in the access device or stored in a home subscriber server HSS.

On the basis of the fourth aspect, optionally, when the access device is a V2X service unit, the second message is a temporary identity request message, and the first message is a temporary identity response message.

On the basis of the fourth aspect, optionally, the second message is a service authorization request message, and the first message is a service authorization response message.

On the basis of the fourth aspect, optionally, the second message is a communication security parameter request message, and the first message is a communication security parameter response message.

On the basis of the fourth aspect, optionally, the second message is a radio resource request message, and the first message is a radio resource response message.

On the basis of the fourth aspect, optionally, before generating the first temporary identity sequence for the terminal, the processing unit is further configured to:
 check an available temporary identity that exists in the temporary identity sequence sent to the terminal last time, where the available temporary identity is a temporary identity with an unexpired lifetime.

On the basis of the fourth aspect, optionally, the first message is a temporary identity notification message.

On the basis of the fourth aspect, optionally, when generating the temporary identity sequence for the terminal, the processing unit is specifically configured to:
 generate the temporary identity sequence for the terminal, and set a lifetime for each temporary identity in the temporary identity sequence.

According to a fifth aspect, a terminal device is provided. The terminal device includes a processor, a memory, a transmitter, and a receiver, where the memory stores computer readable program, and the processor controls the transmitter and the receiver by running the program in the memory, so as to implement the communications method in the first aspect.

According to a sixth aspect, a network device is provided. The device includes a processor, a memory, and a transceiver, where the memory stores computer readable program, and the processor controls the transceiver by running the program in the memory, so as to implement the communications method in the second aspect.

According to a seventh aspect, a communications system is provided. The communications system includes a first device and a second device, where the first device is the communications apparatus in the third aspect or the terminal device in the fifth aspect, and the second device is the communications apparatus in the fourth aspect or the network device in the sixth aspect.

According to the V2X communications solution provided in the embodiments of the present invention, the access device on the network side generates and distributes the temporary identity sequence to the terminal; when processing a PDCP layer message based on the received temporary identity sequence, the terminal generates, based on the selected temporary identity, the PDCP data PDU, which is used when a V2X message of the terminal is sent, thereby implementing a security requirement of V2X communication. A size of the temporary identity is far smaller than a data volume of a security certificate in the prior art, and therefore security overheads of the V2X communication are low, and a message processing delay is reduced.

BRIEF DESCRIPTION OF DRAWINGS

FIG. 3A and FIG. 3B are schematic diagrams of a message format of a PDCP data PDU according to an embodiment of the present invention;

DESCRIPTION OF EMBODIMENTS

Figure 1:
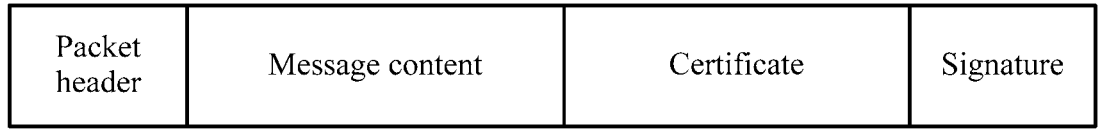
FIG. 1 is a schematic diagram of a format of an existing V2X message.

The following describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In this embodiment of the present invention, an access device on a network side generates an area key for a coverage area of one or more eNBs/TAs (tracking area). When a V2X communications terminal passes authentication and an authorization check, the access device on the network side sends the area key to the V2X communications terminal. A V2X communications terminal that is located in the same area with the foregoing V2X communications terminal may use the area key for communication. Three security requirements of a V2X are also implemented by using the symmetric key solution.

In an implementation, the access device on the network side may be an evolved NodeB (eNB), and the foregoing area key is generated and managed by the eNB.

In another implementation, a V2X server is deployed on the network side, so that the foregoing area key may be generated and managed and configured on a corresponding eNB by the V2X server. In this implementation, a V2X server may be deployed in a system; and the V2X server is configured to generate and manage the area key, and configure the area key on the corresponding eNB. Keys of all areas are generated and managed by the V2X server, and therefore an area key reuse problem can be avoided.

In another implementation, the access device on the network side may be a V2X server deployed on the network side. The V2X server is configured to generate and manage the area key. The V2X server may not send the area key to the eNB, that is, the eNB does not sense the area key. The V2X server may directly allocate an area key to the terminal, or allocate an area key to the terminal by using an MME.

It should be noted that the V2X server may be deployed within an MNO (carrier network) network domain, or may be deployed outside the MNO network domain.

In this embodiment of the present invention, the V2X may be referred to as an LTE-V2X, that is, a vehicle and another terminal based on Long Term Evolution (LTE). The V2X communication may include but is not limited to: V2V communication, vehicle-to-infrastructure (V2I) communication, and vehicle-to-pedestrian (V2P) communication. The V2I communication may include but is not limited to: communication from a vehicle to a base station, communication from a vehicle to a roadside unit, and communication from a vehicle to a communications module on a traffic light.

For an anonymity security requirement of the V2X, the access device on the network side generates and distributes one temporary identity sequence, which is referred to as LTE V2X temporary IDs in this embodiment of the present invention, and sends the temporary identity sequence to the V2X communications terminal. For a non-traceability security requirement of the V2X, the V2X communications terminal needs to periodically replace a used temporary identity. For a non-repudiation security requirement of the V2X, a security environment (secure environment) needs to be implemented on the V2X communications terminal. Specifically, a trusted computing module of the terminal may be used to implement the following functions:

1) Storage Protection Function

This function is to store communication parameters such as temporary identity sequence LTE V2X temporary IDs that are distributed by the access device on the network side, the area key, and an integrity algorithm identifier for calculating a MAC-I code are stored, and to ensure that no communication parameter is obtained by an attacker and a user of the terminal.

2) Execution Protection Function

After an application-layer message reaches a PDCP layer, a temporary identity (LTE V2X temporary ID) currently used by the terminal, an area identity (ID) of an area in which the terminal is located, an area key identifier, and a timestamp are added to a PDCP header. The MAC-I code is calculated based on the area key, an integrity algorithm, the PDCP header, and a data payload, and the MAC-I code is added to a PDCP packet. A V2X communications terminal that receives the message may verify, by using the MAC-I code, whether the message is tampered with, so as to ensure that the foregoing execution process is not intervened in by the attacker and the user of the terminal.

It can be learned that, after being processed by the trusted computing module, the application-layer message includes identity information of the V2X communications terminal. The attacker cannot be involved in processing of the temporary identity under the protection of the trusted computing module, so that the identity information cannot be forged in the message. In addition, the MAC-I code ensures integrity of the identity information of the terminal in a transmission process, and non-repudiation is implemented based on this.

Figure 2:
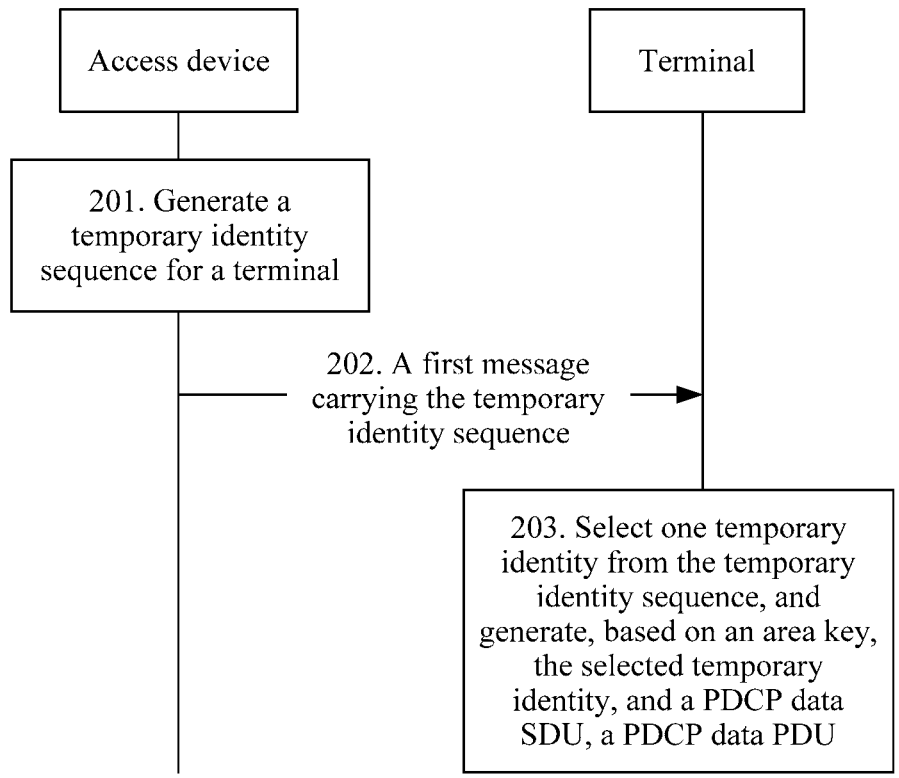
FIG. 2 is a schematic flowchart of a communications method according to an embodiment of the present invention.

Referring to FIG. 2, an embodiment of the present invention provides a communications method. A specific procedure is as follows:

Step 201: An access device generates a temporary identity sequence for a terminal.

The access device may be a V2X server or an eNB.

Specifically, when generating the temporary identity sequence for the terminal, the access device sets a lifetime for each temporary identity in the temporary identity sequence.

Generally, a time value is set for the lifetime of the temporary identity. A corresponding temporary identity may be used within the set time value, and the corresponding temporary identity cannot be used when the set time value is exceeded.

It should be noted that, for the temporary identity sequence, that is, temporary IDs, attention should be paid to the following two key points: First, the access device needs to learn a specific terminal that uses a temporary identity at a specific moment; and second, the access device needs to ensure that different terminals use different temporary IDs at a specific moment. To satisfy the two points, the access device sets a lifetime for each temporary ID. Specifically, the following two methods may be used:

Method 1: When the access device generates one group of temporary IDs for the terminal, the access device sets a unique lifetime for each temporary ID. When selecting a temporary ID, a security module in the terminal first uses a temporary ID with a shortest lifetime. In this way, the access device learns a specific temporary ID used by the terminal at a specific moment.

Method 2: When the access device generates one group of temporary IDs for the terminal, the access device sets a same lifetime for the group of temporary IDs. The security module in the terminal determines a using sequence of temporary IDs based on a local policy. In this way, the access device learns whether a temporary ID is used by the terminal at a specific moment.

In this embodiment of the present invention, the access device may allocate and maintain temporary IDs by using the following two methods:

Method 1: The access device stores, in a context of the terminal, the temporary IDs of the terminal and a lifetime corresponding to each temporary ID. When the access device allocates the current terminal new temporary IDs, the access device checks temporary ID lists of all terminals to determine whether a same temporary ID has been allocated to another terminal. If the same temporary ID has been allocated to another terminal, it is checked whether the temporary ID has expired; and if the temporary ID has expired, the expired temporary ID is deleted from a temporary ID list of the terminal, and the temporary ID is allocated to the current terminal.

Method 2: The access device stores, in the context of the terminal, the temporary IDs of the terminal and a lifetime corresponding to each temporary ID. The access device may periodically check a temporary ID list of each terminal, and delete an expired temporary ID. When allocating a new temporary ID to the current terminal, the access device checks whether the same temporary ID is allocated to another terminal. If the same temporary ID is allocated to another terminal, the temporary ID cannot be allocated to another terminal.

Step 202: The access device sends a first message carrying the temporary identity sequence to the terminal.

In an implementation, before step 201 is performed, the following procedure is further performed:

The access device receives a second message that is sent by the terminal and that is used to obtain the temporary identity sequence of the terminal, where the second message carries an identity of the terminal; checks whether the terminal has authorization permission for V2X communication; and determines that the terminal has the authorization permission.

Specifically, a specific process in which the access device checks whether the terminal has the authorization permission for the V2X communication is: The access device obtains V2X authorization information of the terminal, and performs an authorization check on the terminal based on the V2X authorization information of the terminal. A specific implementation in which the access device checks whether the terminal has the authorization permission for the V2X communication is: The access device determines, based on the identity of the terminal, whether the terminal is allowed to perform a V2X service, where the V2X authorization information of the terminal is locally stored in the access device or stored in an home subscriber server (HSS).

Optionally, when the access device is the V2X server, in an implementation, the second message is a temporary identity request message, and the first message is a temporary identity response message.

Optionally, when the access device is the V2X server, in another implementation, the second message is a service authorization request message, and the first message is a service authorization response message.

Optionally, when the access device is the V2X server, in another implementation, the second message is a communication security parameter request, and the first message is a communication security parameter response message.

Optionally, when the access device is the eNB, in an implementation, the second message is a radio resource request message, and the first message is a radio resource response message.

Optionally, when the access device is the eNB, in another implementation, the second message is the communication security parameter request, and the first message is the communication security parameter response message.

In an implementation, before step 201 is performed, the following procedure is further performed:

The access device checks an available temporary identity that exists in the temporary identity sequence sent to the terminal last time, where the available temporary identity is a temporary identity with an unexpired lifetime. Correspondingly, in this implementation, the first message is a temporary identity notification message.

Step 203: The terminal selects one temporary identity from the temporary identity sequence, and generates, based on an area key of the terminal, the selected temporary identity, and a Packet Data Convergence Protocol (PDCP) data service data unit (SDU) of the terminal, a PDCP data protocol data unit (PDU) of the terminal, where the area key is an area key of an area corresponding to location information of the terminal.

It should be noted that the temporary identity selected in step 203 is an available temporary identity with an unexpired lifetime, that is, within a lifetime.

A format of the PDCP data PDU that is obtained after the PDCP data SDU is processed is a PDCP header+a data payload+a message authentication code. The PDCP header carries the selected temporary identity, an area identity of the area corresponding to the location information of the terminal, an identity of the area key, and a timestamp at which the terminal processes the PDCP data SDU. The data payload includes content of the PDCP data SDU, and describes state information of the terminal, where the state information specifically includes a speed, acceleration, a direction of the terminal, and the like. For V2X communication that needs to be encrypted, the data payload is an encrypted data payload; for V2X communication that does not need to be encrypted, the data payload is an unencrypted data payload. The message authentication code is obtained by using the area key to perform integrity protection on the PDCP header and the data payload. Specifically, for the message format of the PDCP data PDU, refer to FIG. 3A or FIG. 3B.

In this embodiment of the present invention, an anonymity security requirement in the V2X communication is implemented by generating and distributing, by the access device, one temporary identity sequence to the terminal. A non-traceability security requirement in the V2X communication is implemented by periodically replacing, by the terminal, a used temporary identity. For a non-repudiation security requirement in the V2X communication, a trusted computing module of the terminal adds the temporary identity of the terminal to the PDCP header, calculates the message authentication code, adds the message authentication code to a PDCP packet, generates a V2X message through underlying processing, and sends the V2X message. A value of the timestamp in the PDCP data PDU represents a time point when the terminal processes the PDCP data SDU (for example, 2010-11-04 16:19:42). After receiving the V2X message, another terminal may check, based on the timestamp, whether the V2X message is a replay message. If an attacker generates a malicious message at an application layer, which causes a traffic accident, a victim may query, in the access device based on a temporary identity in the received malicious message, an (International Mobile Subscriber Identity (IMSI) corresponding to a terminal, so as to identify a hit-and-run vehicle.

The following describes in detail, based on seven embodiments, a process in which the terminal obtains the temporary identity sequence generated on the network side.

Embodiment 1

Figure 4:
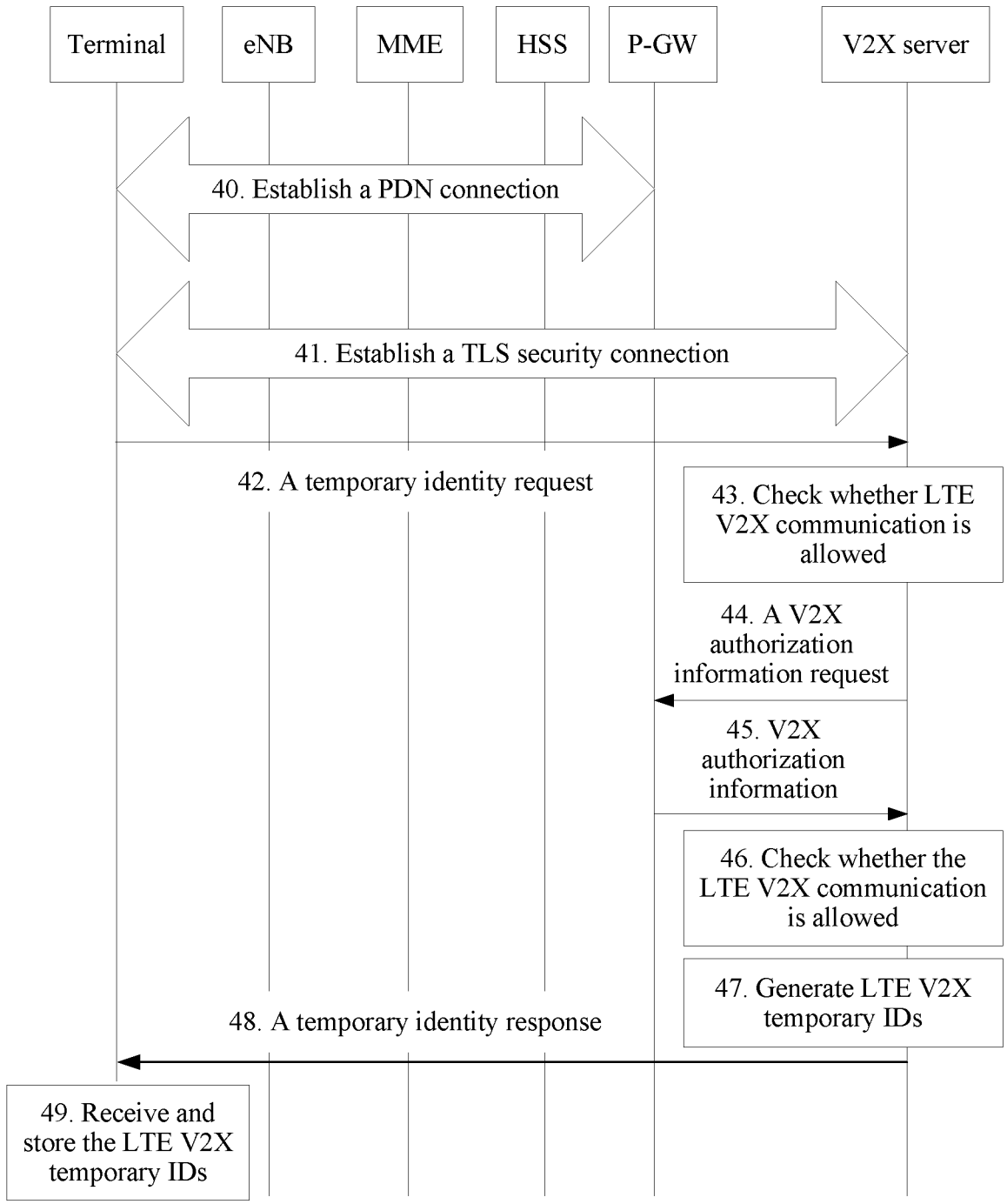
FIG. 4 is a schematic flowchart of a communications method according to Embodiment 1 of the present invention.

An implementation scenario in Embodiment 1 is: An LTE-V2X server manages and allocates temporary IDs used in LTE V2X communication, and a terminal obtains LTE V2X temporary IDs in an independent temporary identity request process. Specific steps are shown in FIG. 4.

Step 40: A public data network (PDN) connection has been established between the terminal and a PGW.

Step 41: The terminal establishes a Transport Layer Security (TLS) Protocol connection to the LTE-V2X server, where the TLS security connection may be based on a certificate or based on a symmetric key (GBA).

Step 42: The terminal sends a temporary identity request message to the LTE-V2X server, where the temporary identity request message carries an identity of the terminal, and optionally the identity of the terminal may be an IMSI.

Step 43: If the LTE-V2X server stores LTE V2X authorization information of the terminal, the LTE-V2X server checks, based on the stored LTE V2X authorization information, whether the terminal is allowed to perform LTE V2X communication; and when it is determined that the terminal has authorization permission for the V2X communication, the LTE-V2X server performs step 47.

Step 44: If the LTE-V2X server does not store the LTE V2X authorization information of the terminal, the LTE-V2X server sends an LTE V2X authorization information request message of the terminal to an HSS.

Step 45: The HSS sends the LTE V2X authorization information of the terminal to the LTE-V server.

Step 46: The LTE-V2X server checks, based on LTE V2X authorization information fed back by the HSS, whether the terminal is allowed to perform the LTE V2X communication; and when it is determined that the terminal has authorization permission for the V2X communication, the LTE-V2X server performs step 47.

Step 47: The LTE-V2X server generates, for the terminal, a plurality of LTE V2X temporary IDs, and stores the plurality of LTE V2X temporary IDs as a context of the terminal.

Step 48: The LTE-V2X server sends a temporary identity response message to the terminal, where the temporary identity response message carries the LTE V2X temporary IDs.

Step 49: A security environment of the terminal receives and stores the LTE V2X temporary IDs, which are used when a V2X message of the terminal is sent.

Embodiment 2

Figure 5:
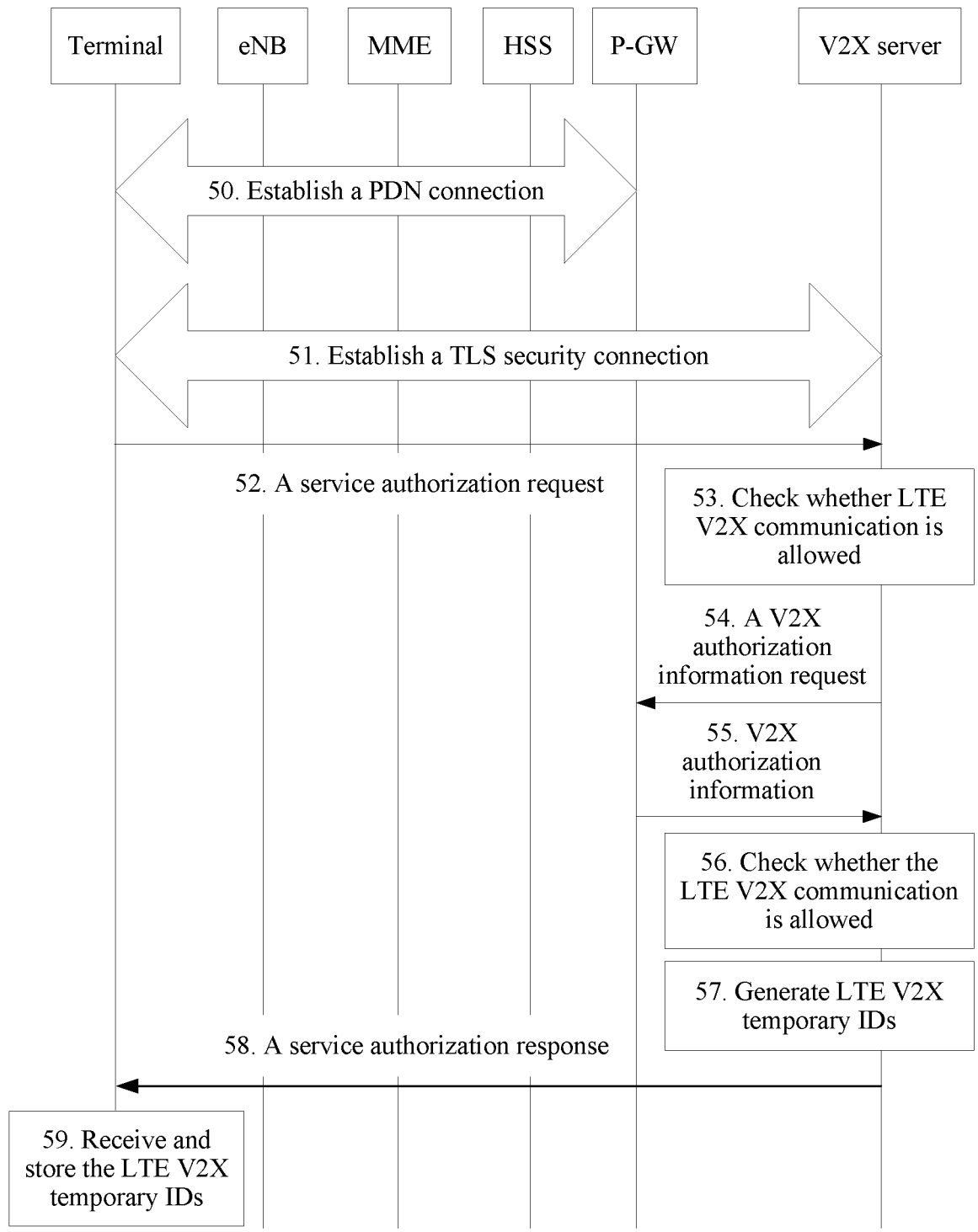
FIG. 5 is a schematic flowchart of a communications method according to Embodiment 2 of the present invention.

An implementation scenario in Embodiment 2 is similar to the implementation scenario in Embodiment 1: An LTE-V2X server manages and allocates temporary IDs used in LTE V2X communication. However, a terminal in Embodiment 2 obtains LTE V2X temporary IDs in an LTE-V2X service authorization request process. Specific steps are shown in FIG. 5.

Step 50 to step 51 are the same as step 40 to step 41 in Embodiment 1, and details are not described herein again.

Step 52: The terminal sends a service authorization request message to the LTE-V2X server, where the service authorization request message carries an identity of the terminal, and optionally, the identity of the terminal may be an IMSI.

Step 53 to step 57 are the same as step 43 to step 47 in Embodiment 1, and details are not described again.

Step 58: The LTE-V2X server sends a service authorization response message to the terminal, where the service authorization response message carries LTE V2X temporary IDs. Optionally, in addition to carrying the LTE V2X temporary IDs, the service authorization response message carries a communication parameter that is required in the LTE-V2X communication.

Step 59 is the same as step 49 in Embodiment 1, and details are not described herein again.

Embodiment 3

Figure 6:
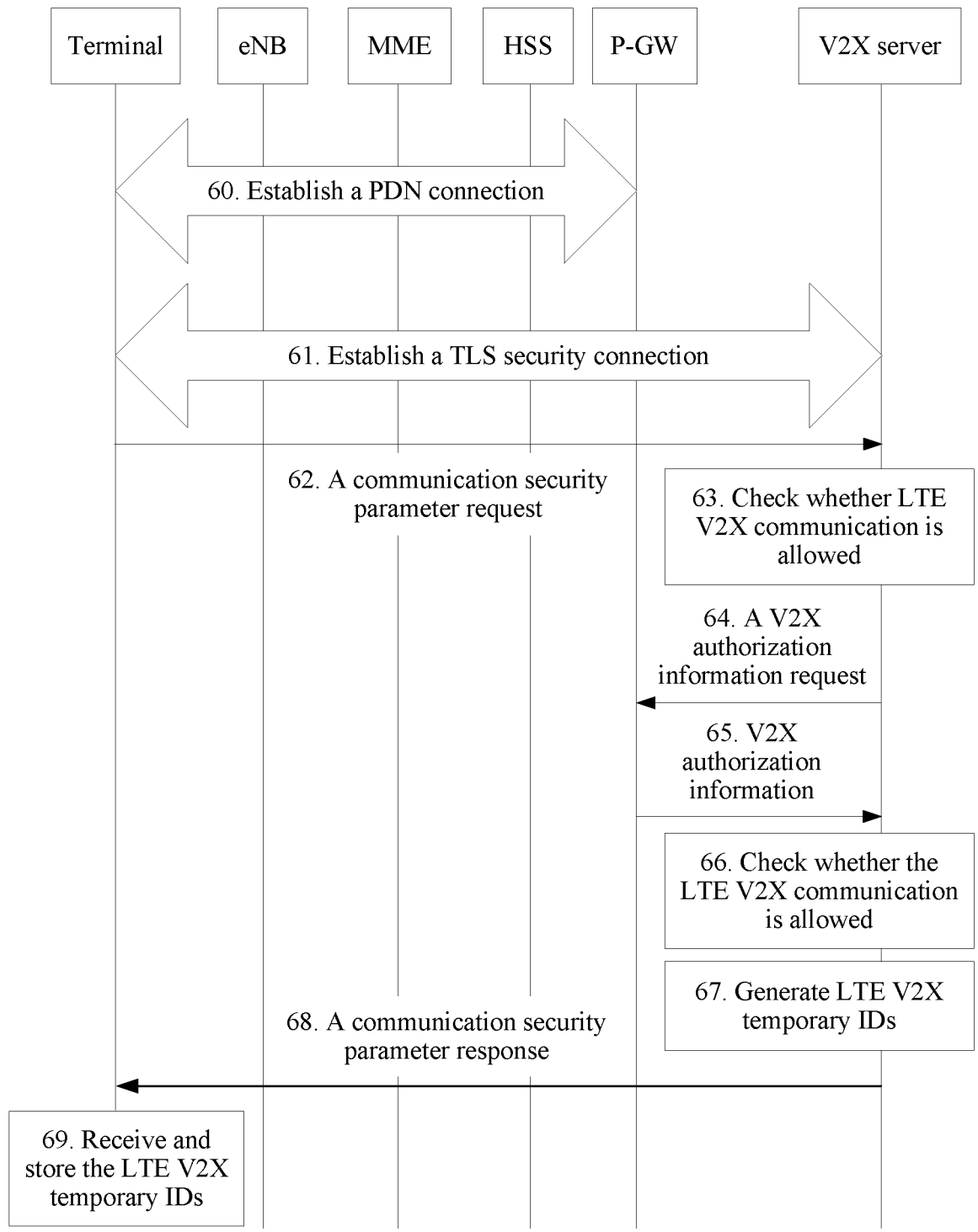
FIG. 6 is a schematic flowchart of a communications method according to Embodiment 3 of the present invention.

An implementation scenario in Embodiment 3 is similar to the implementation scenario in Embodiment 1: An LTE-V2X server manages and allocates temporary IDs used in LTE V2X communication. However, a terminal in Embodiment 3 obtains LTE V2X temporary IDs in an LTE-V2X communication security parameter request process. Specific steps are shown in FIG. 6.

Step 60 to step 61 are the same as step 40 to step 41 in Embodiment 1, and details are not described again.

Step 62: The terminal sends a communication security parameter request message to the LTE-V2X server, where the communication security parameter request message carries an identity of the terminal, and optionally, the identity of the terminal may be an IMSI.

Step 63 to step 67 are the same as step 43 to step 47 in Embodiment 1, and details are not described herein again.

Step 68: The LTE-V2X server sends a communication security parameter response message to the terminal, where the communication security parameter response message carries LTE V2X temporary IDs. Optionally, in addition to carrying the LTE V2X temporary IDs, the communication security parameter response message carries a communication security parameter that is required in the LTE-V2X communication.

Step 69 is the same as step 49 in Embodiment 1, and details are not described herein again.

Embodiment 4

Figure 7:
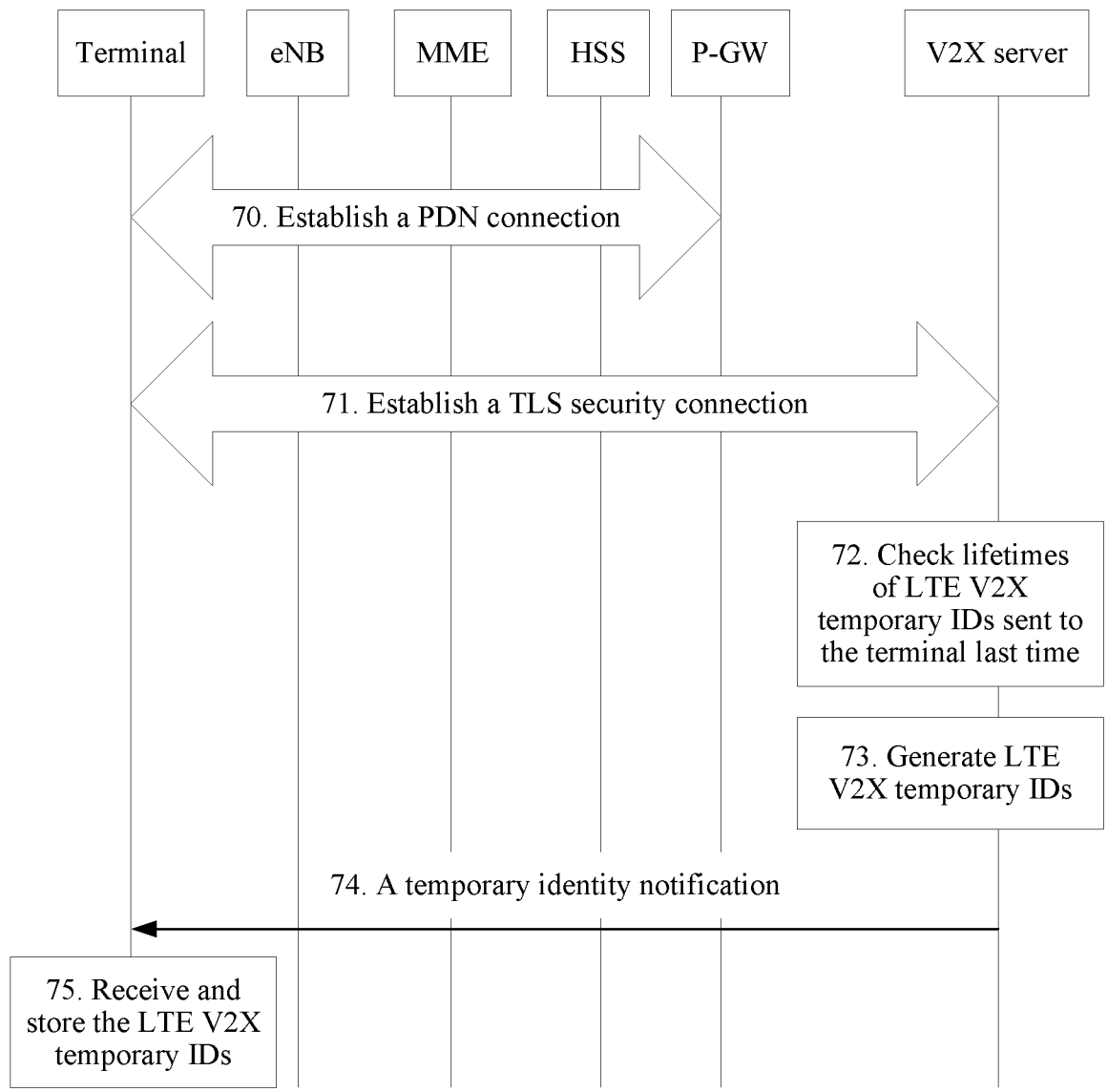
FIG. 7 is a schematic flowchart of a communications method according to Embodiment 4 of the present invention.

An implementation scenario in Embodiment 4 is similar to the implementation scenario in Embodiment 1: An LTE-V2X server manages and allocates temporary IDs used in LTE V2X communication. However, in Embodiment 4, the LTE-V2X server pushes, in an active push process, LTE-V2X temporary IDs that are used in the LTE-V2X communication to the terminal. Specific steps are shown in FIG. 7.

Step 70 to step 71 are the same as step 40 to step 41 in Embodiment 1, and details are not described again.

Step 72: The LTE-V2X server checks lifetimes of the LTE V2X temporary IDs sent to the terminal last time.

Step 73: When the LTE-V2X server determines that unexpired LTE V2X temporary IDs exist in the LTE V2X temporary IDs sent to the terminal last time, the LTE-V2X server generates a plurality of new LTE V2X temporary IDs, and stores the plurality of new LTE V2X temporary IDs as a context of the terminal.

Step 74: The LTE-V2X server returns a temporary identity notification message to the terminal, where the temporary identity notification message carries new LTE V2X temporary IDs.

Step 75: A secure environment of the terminal receives and stores the LTE V2X temporary IDs, which are used when a V2X message of the terminal is sent.

Embodiment 5

Figure 8:
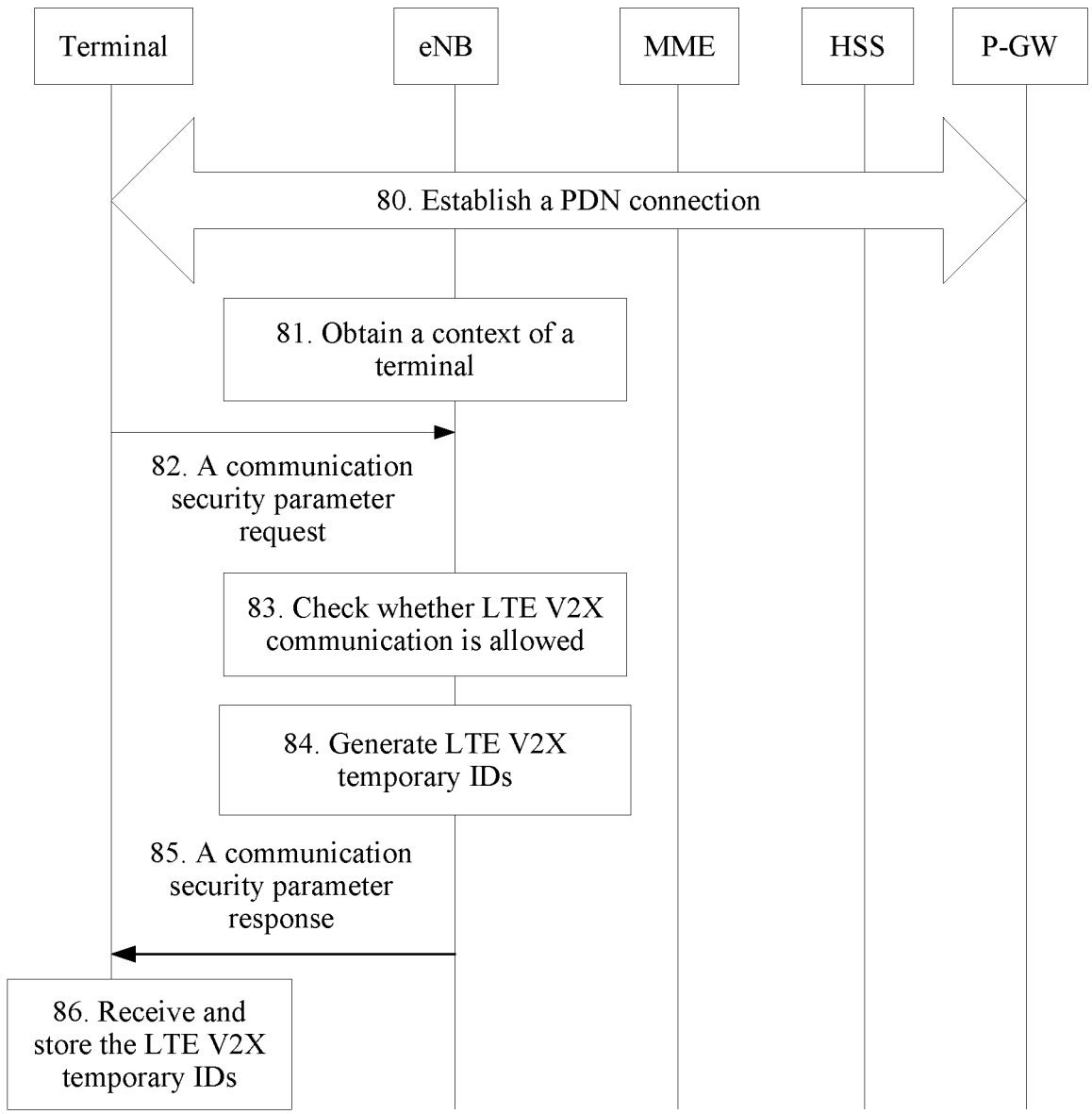
FIG. 8 is a schematic flowchart of a communications method according to Embodiment 5 of the present invention.

An implementation scenario in Embodiment 5 is: An eNB manages and allocates temporary IDs used in LTE V2X communication, and a terminal obtains LTE V2X temporary IDs in a communication security parameter request process. Specific steps are shown in FIG. 8.

Step 80: A public data network (PDN) connection has been established between the terminal and a PGW.

Step 81: The eNB obtains a context of the terminal, where the context includes an LTE V2X communication context, and optionally, the LTE V2X communication context is obtained when a bearer of the terminal is established, or is obtained from another camped-on eNB when the terminal is handed over to the current eNB.

Step 82: The terminal sends a communication security parameter request message to the eNB, where the communication security parameter request message carries an identity of the terminal, and optionally, the identity of the terminal may be an IMSI.

Step 83: The eNB checks, based on LTE V2X authorization information in the context that is stored by the eNB and that is of the terminal, whether the terminal is allowed to perform the LTE V2X communication; and when it is determined that the terminal has authorization permission for the V2X communication, step 84 is performed.

Step 84: The eNB generates, for the terminal, a plurality of LTE V2X temporary IDs, and stores the plurality of LTE V2X temporary IDs as a context of the terminal.

Step 85: The eNB sends a communication security parameter response message to the terminal, where the communication security parameter response message carries LTE V2X temporary IDs. Optionally, in addition to carrying the LTE V2X temporary IDs, the communication security parameter response message carries a communication security parameter that is required in the LTE-V2X communication.

Step 86: A security environment of the terminal receives and stores the LTE V2X temporary IDs, which are used when a V2X message of the terminal is sent.

Embodiment 6

Figure 9:
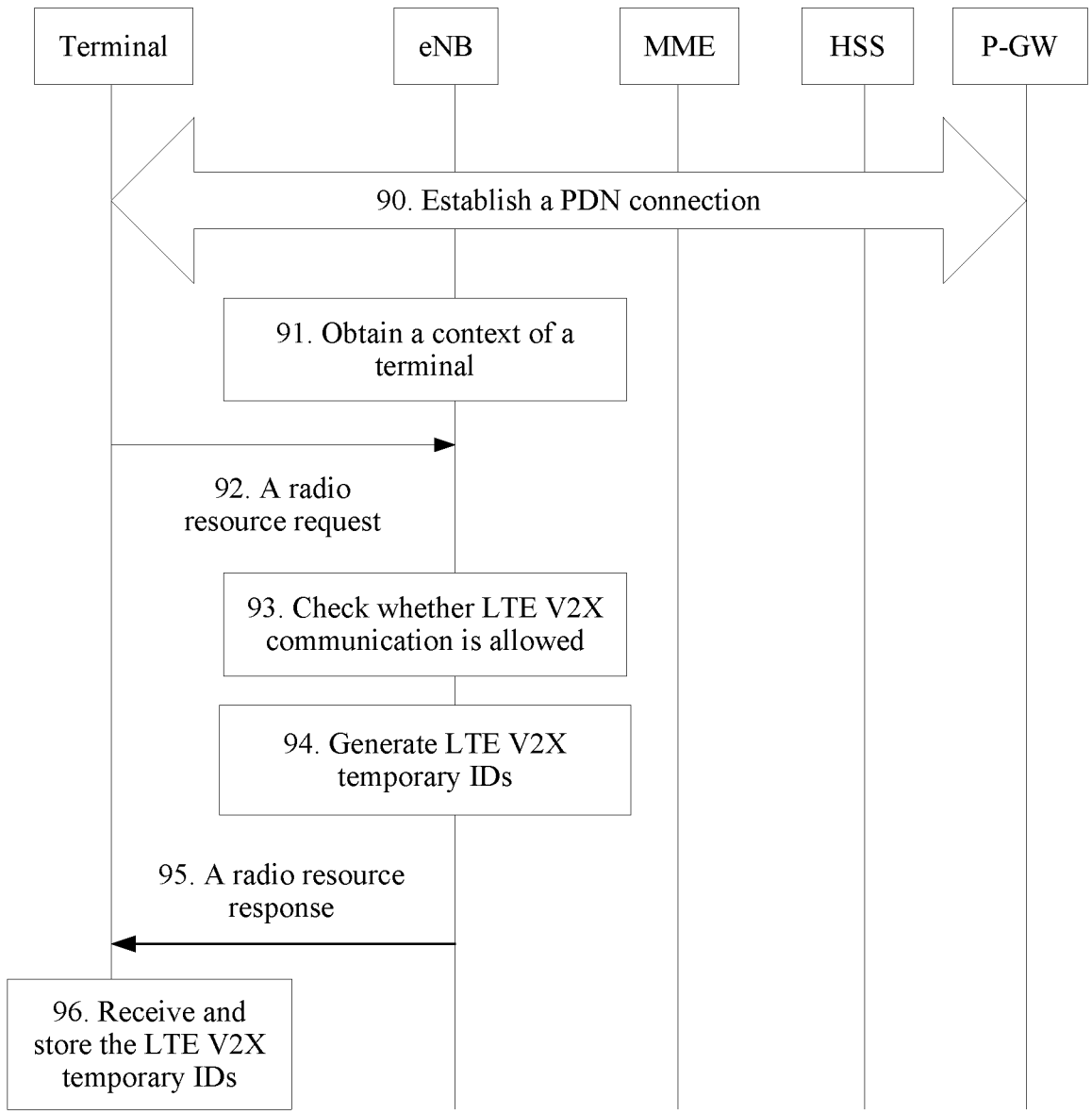
FIG. 9 is a schematic flowchart of a communications method according to Embodiment 6 of the present invention.

An implementation scenario in Embodiment 6 is similar to the implementation scenario in Embodiment 5: An eNB manages and allocates temporary IDs used in LTE V2X communication. However, a terminal in Embodiment 6 obtains LTE V2X temporary IDs in an LTE-V2X radio resource request process. Specific steps are shown in FIG. 9.

Step 90 to step 91 are the same as step 80 to step 81 in Embodiment 1, and details are not described herein again.

Step 92: The terminal sends a radio resource request message to the eNB, where the radio resource request message carries an identity of the terminal, and optionally, the identity of the terminal may be an IMSI.

Step 93 to step 94 are the same as step 83 to step 84 in Embodiment 1, and details are not described herein again.

Step 95: The eNB sends a radio resource response message to the terminal, where the radio resource response message carries LTE V2X temporary IDs. Optionally, in addition to carrying the LTE V2X temporary IDs, the radio resource response message carries radio resource information allocated by the eNB in the LTE-V2X communication.

Step 96 is the same as step 86 in Embodiment 5, and details are not described herein again.

Embodiment 7

Figure 10:
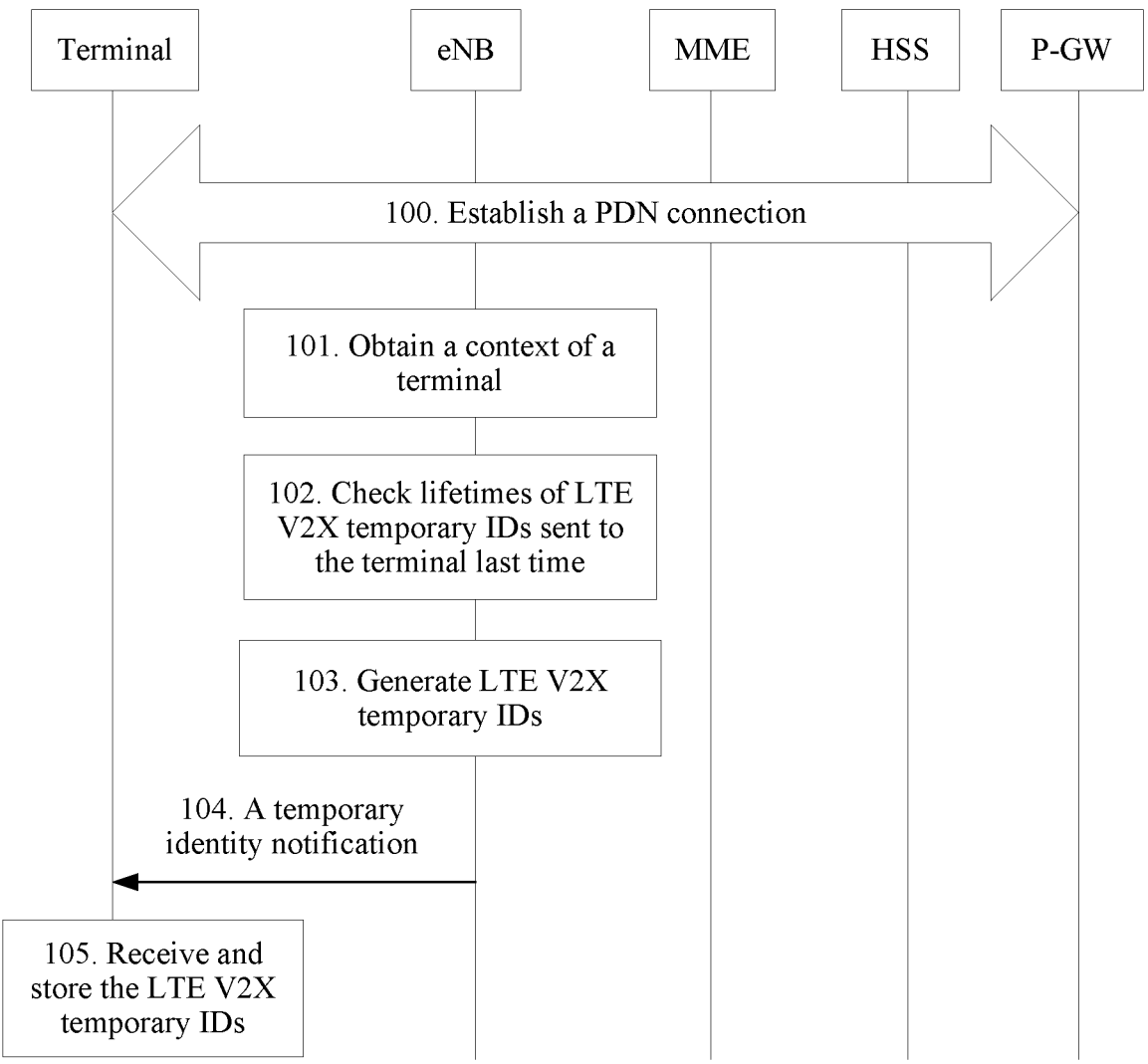
FIG. 10 is a schematic flowchart of a communications method according to Embodiment 7 of the present invention.

An implementation scenario in Embodiment 7 is similar to the implementation scenario in Embodiment 5: An eNB manages and allocates temporary IDs used in LTE V2X communication. However, in Embodiment 7, the eNB pushes, in an active push process, LTE-V2X temporary IDs that are used in the LTE-V2X communication to the terminal. Specific steps are shown in FIG. 10.

Step 100 to step 101 are the same as step 80 to step 81 in Embodiment 1, and details are not described herein again.

Step 102: The eNB checks lifetimes of the LTE V2X temporary IDs sent to the terminal last time.

Step 103: When the eNB determines that unexpired LTE V2X temporary IDs exist in the LTE V2X temporary IDs sent to the terminal last time, the eNB generates a plurality of new LTE V2X temporary IDs, and stores the plurality of new LTE V2X temporary IDs as a context of the terminal.

Step 104: The eNB returns a temporary identity notification message to the terminal, where the temporary identity notification message carries new LTE V2X temporary IDs.

Step 105: A secure environment of the terminal receives and stores the LTE V2X temporary IDs, which are used when a V2X message of the terminal is sent.

Figure 11:
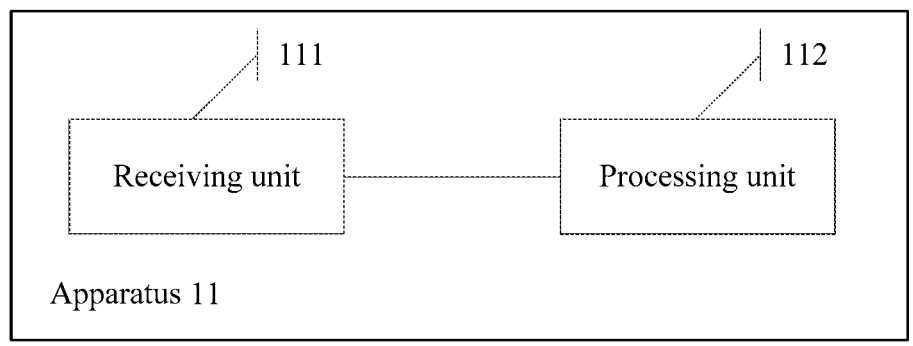
FIG. 11 is a schematic structural diagram of a communications apparatus on a terminal side according to an embodiment of the present invention.

Based on the communications method provided in the foregoing embodiment, an embodiment of the present invention provides an apparatus 11. The apparatus 11 is applied to a terminal. FIG. 11 is a schematic structural diagram of the apparatus 11 according to an embodiment of the present invention. As shown in FIG. 11, the apparatus 11 includes a receiving unit 111 and a processing unit 112.

The receiving unit 111 is configured to receive a first message sent by an access device, where the first message carries a temporary identity sequence generated by the access device for the apparatus.

The processing unit 112 is configured to: select one temporary identity from the temporary identity sequence; and generate, based on an area key of the apparatus, the selected temporary identity, and a PDCP data SDU of the apparatus, a PDCP data PDU of the apparatus, where the area key is an area key of an area corresponding to location information of the apparatus.

Optionally, before receiving the first message sent by the access device, the receiving unit 111 is further configured to:

send a second message that is used to obtain the temporary identity sequence of the apparatus to the access device, where the second message carries an identity of the apparatus.

Optionally, when the access device is a V2X server, the second message is a temporary identity request message, and the first message is a temporary identity response message.

Optionally, when the access device is the V2X server, the second message is a service authorization request message, and the first message is a service authorization response message.

Optionally, when the access device is the V2X server or an eNB, the second message is a communication security parameter request message, and the first message is a communication security parameter response message.

Optionally, when the access device is the eNB, the second message is a radio resource request message, and the first message is a radio resource response message.

Optionally, the PDCP data PDU includes a PDCP header, a data payload, and a message authentication code, where: the PDCP header carries the selected temporary identity, an area identity of the area corresponding to the location information of the apparatus, an identity of the area key, and a timestamp at which the apparatus processes the PDCP data SDU; the data payload is data content of an encrypted PDCP data SDU for V2X communication that needs to be encrypted, and is used to describe state information of the apparatus; and the message authentication code is obtained by using the area key to perform integrity protection on the PDCP header and the data payload.

The foregoing apparatus 11 in this embodiment of the present invention may be an independent component, or may be integrated into another component. For example, the foregoing apparatus 11 provided in this embodiment of the present invention may be a base station in an existing communications network or a component integrated in the base station.

It should be noted that for function implementation and an interaction manner of each unit of the apparatus 13 in this embodiment of the present invention, reference may further be made to description of a related method embodiment. Details are not described herein again.

In addition, each foregoing "unit" may be implemented by using an application-specific integrated circuit (ASIC), a processor and a memory that execute one or more software or firmware programs, an integrated logic circuit, and/or another device that may provide the foregoing functions.

Figure 12:
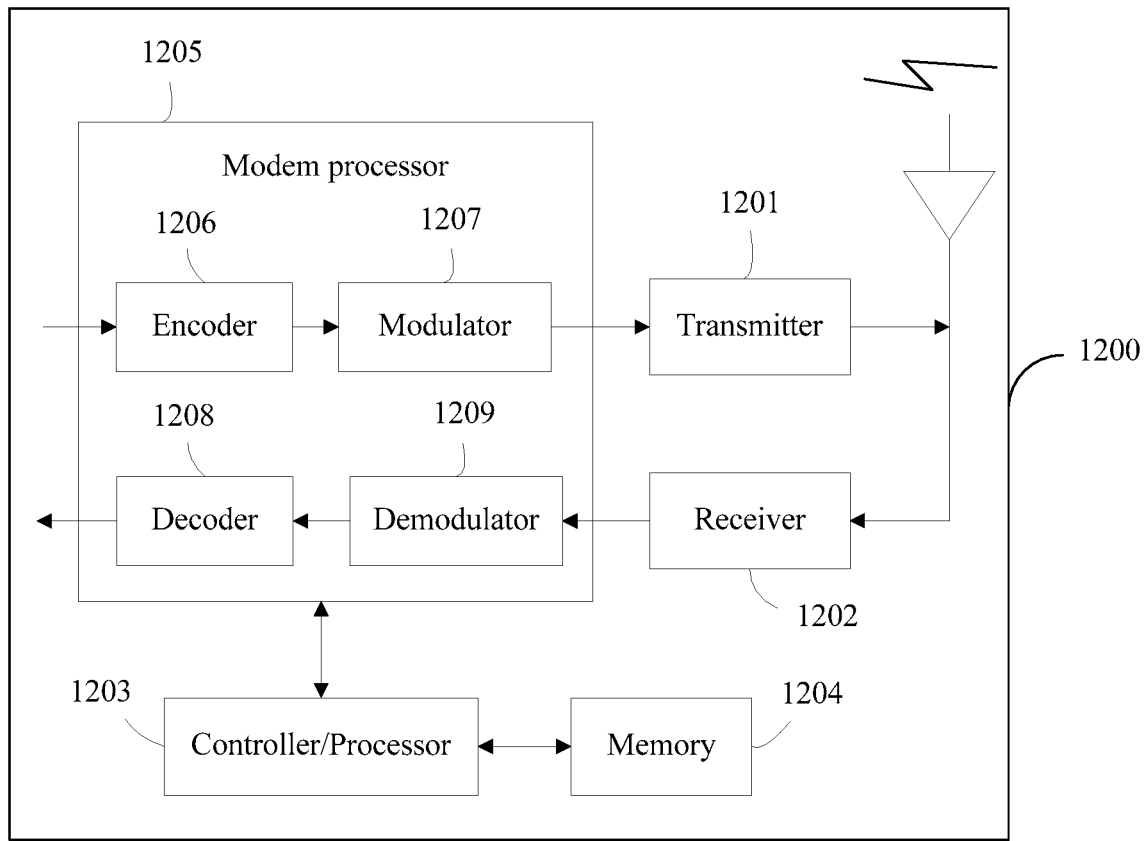
FIG. 12 is a schematic structural diagram of a terminal device according to an embodiment of the present invention.

Referring to FIG. 12, FIG. 12 is a simplified schematic diagram of a possible design structure of a terminal in the foregoing embodiment. A terminal device 1200 includes a transmitter 1201, a receiver 1202, a controller/processor 1203, a memory 1204, and a modem processor 1205.

The transmitter 1201 adjusts (for example, through analog conversion, filtering, amplification, and up-conversion) an output sampling and generates an uplink signal. The uplink signal is transmitted to the base station in the foregoing embodiment by an antenna. In a downlink, the antenna receives a downlink signal transmitted by the base station in the foregoing embodiment. The receiver 1202 adjusts (for example, through filtering, amplification, down-conversion, and digitization) a signal received from the antenna and provides an input sampling. In the modem processor 1205, an encoder 1206 receives service data and a signaling message to be sent in the uplink, and processes (for example, through formatting, coding, and interleaving) the service data and the signaling message. A modulator 1207 further processes (for example, through symbol mapping and modulation) the service data and the signaling message that are encoded, and provides an output sampling. A demodulator 1209 processes (for example, through demodulation) the input sampling and provides symbol estimation. A decoder 1208 processes (for example, through de-interleaving and decoding) the symbol estimation and provides the data and the signaling message that are decoded and that are sent to the terminal. The encoder 1206, the modulator 1207, the demodulator 1209, and the decoder 1208 may be implemented by the composite modem processor 1205. These units perform processing based on a radio access technology (for example, an access technology of LTE or another evolution system) used by a radio access network.

The controller/processor 1203 performs control management on actions of the terminal, and is configured to perform processing that is performed by the terminal in the foregoing embodiment. As an example, the controller/processor 1203 is configured to support the terminal in performing an execution process related to the terminal in FIG. 2 and FIG. 4 to FIG. 10. The memory 1204 is configured to store program code and data that are used by the terminal, including:

receiving a first message sent by an access device, where the first message carries a temporary identity sequence generated by the access device for the apparatus; and selecting one temporary identity from the temporary identity sequence, and generating, based on an area key of the apparatus, the selected temporary identity, and a PDCP data SDU of the apparatus, a PDCP data PDU of the apparatus, where the area key is an area key of an area corresponding to location information of the apparatus.

The controller/processor that is configured to perform a function of the foregoing terminal of the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various logic blocks, modules, and circuits that are used as examples and that are described with reference to disclosed content in the present invention. Alternatively, the processor may be a combination for implementing a computing function, such as a combination including one or more microprocessors or a combination of a DSP and a microprocessor.

Figure 13:
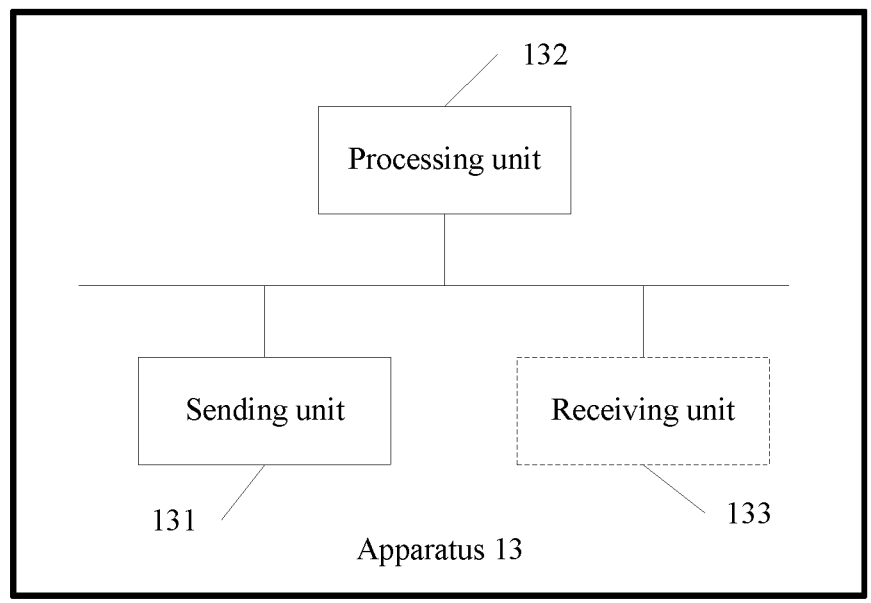
FIG. 13 is a schematic structural diagram of a communications apparatus on a network side according to an embodiment of the present invention.

An embodiment of the present invention further provides a communications apparatus 13. The apparatus 13 may be a base station or another device deployed on a network side. FIG. 13 is a schematic structural diagram of the apparatus 13 according to an embodiment of the present invention. As shown in FIG. 13, the apparatus 13 includes a sending unit 131 and a processing unit 132.

The processing unit 132 is configured to generate a temporary identity sequence for a terminal.

The sending unit 131 is configured to send a first message carrying the temporary identity sequence to the terminal.

Optionally, when generating the temporary identity sequence for the terminal, the processing unit 132 is specifically configured to:

generate the temporary identity sequence for the terminal, and set a lifetime for each temporary identity in the temporary identity sequence.

Optionally, the apparatus further includes:

a receiving unit 133, configured to: before the processing unit 132 generates the temporary identity sequence for the terminal, receive a second message that is sent by the terminal and that is used to obtain the temporary identity sequence of the terminal, where the second message carries an identity of the terminal; where the processing unit 132 is further configured to check whether the terminal has authorization permission for V2X communication.

Optionally, when checking whether the terminal has the authorization permission for the V2X communication, the processing unit 132 is specifically configured to:

obtain V2X authorization information of the terminal, and perform an authorization check on the terminal based on the V2X authorization information of the terminal, including: determining, based on the identity of the terminal, whether the terminal is allowed to perform a V2X service, where the V2X authorization information of the terminal is locally stored in the access device or stored in an HSS.

Optionally, when the access device is a V2X server, the second message is a temporary identity request message, and the first message is a temporary identity response message.

Optionally, the second message is a service authorization request message, and the first message is a service authorization response message.

Optionally, the second message is a communication security parameter request message, and the first message is a communication security parameter response message.

Optionally, the second message is a radio resource request message, and the first message is a radio resource response message.

Optionally, before generating the first temporary identity sequence for the terminal, the processing unit 132 is further configured to:

check an available temporary identity that exists in the temporary identity sequence sent to the terminal last time, where the available temporary identity is a temporary identity with an unexpired lifetime.

Optionally, the first message is a temporary identity notification message.

Optionally, when generating the temporary identity sequence for the terminal, the processing unit 132 is configured to:

generate the temporary identity sequence for the terminal, and set a lifetime for each temporary identity in the temporary identity sequence.

The foregoing apparatus 13 in this embodiment of the present invention may be an independent component, or may be integrated into another component. For example, the foregoing apparatus 13 provided in this embodiment of the present invention may be a base station in an existing communications network or a component integrated in the base station.

It should be noted that for function implementation and an interaction manner of each unit of the apparatus 13 in this embodiment of the present invention, reference may further be made to description of a related method embodiment. Details are not described herein again.

In addition, each foregoing "unit" may be implemented by using an application-specific integrated circuit (ASIC), a processor and a memory that execute one or more software or firmware programs, an integrated logic circuit, and/or another device that may provide the foregoing functions.

Figure 14:
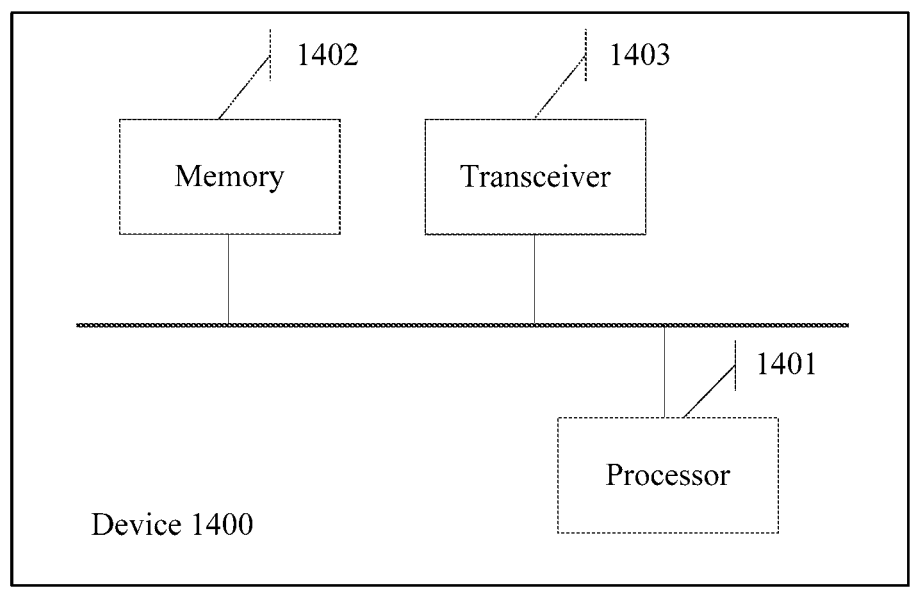
FIG. 14 is a schematic structural diagram of an access device on a network side according to an embodiment of the present invention.

Referring to FIG. 14, an embodiment of the present invention further provides an access device 1400. The device 1400 may be a base station or a V2X server deployed on a network side. FIG. 14 is a schematic structural diagram of a device 1400 according to an embodiment of the present invention. As shown in FIG. 14, the device 1400 includes a processor 1401, a memory 1402, and a transceiver 1403. Program code that is used to perform the solutions of the present invention is stored in the memory 1402, and is controlled by the processor 1401 for execution.

A method in which a program stored in the memory 1402 is used to instruct the processor 1401 to perform communication includes: generating a temporary identity sequence for a terminal, and sending a first message carrying the temporary identity sequence to the terminal.

Optionally, the terminal may be a device 1200 shown in FIG. 12.

It may be understood that the device 1400 in this embodiment may be configured to implement all functions related to the access device, such as an eNB and a V2X server, in the foregoing method embodiment. For a specific implementation process, refer to the access device in the foregoing method embodiment, for example, related description of the eNB and the V2X server in performing the method. Details are not described herein again.

It may be understood that the processor in the device 1400 of this embodiment of the present invention may be a general purpose central processing unit (CPU), a microprocessor, an application-specific integrated circuit application-specific integrated circuit (ASIC), or one or more integrated circuits configured to control program execution of the solutions in the present invention. One or more memories included in the computer system may be a read-only memory read-only memory (ROM) or a static storage device of another type, which is capable of storing static information and a static instruction, a random access memory random access memory (RAM) or a dynamic storage device of another type, which is capable of storing information and an instruction, or may be a magnetic disk memory. The memories are connected to the processor by using the bus.

The memory, for example, a RAM, stores a program of an operating system and a program used to perform the solutions of the present invention. The operating system is a program that is used to control operating of another program and manage system resources.

The memories and transceivers may be connected to the processor by using the bus, or may be separately connected to the processor by using dedicated connection cables.

Code corresponding to the following method is written permanently into a chip by designing programming for the processor, so that when operating, the chip can execute an execution process of the access device in FIG. 2 and FIG. 4 to FIG. 10. How to design programming for the processor is a well-known technology to a person skilled in the art, and details are not described herein.

An embodiment of the present invention further provides a communications system. The communications system includes a first device and a second device, where the first device is the device 1200 in the foregoing embodiment, and the second device is the device 1400 in the foregoing embodiment. The device 1400 sends a first message to the device 1200, where the first message includes a temporary identity sequence generated by the device 1400 for the device 1200. The device 1200 receives the first message sent by the device 1400; and the device 1200 generates, based on a temporary identity in the temporary identity sequence, a PDCP data PDU, which is used when the device 1200 sends a V2X message of the device 1200.

The first device 1200 included in the communications system provided in this embodiment of the present invention provides all functions of the apparatus 11, and can implement a corresponding communications method. The second device 1400 provides all functions of the apparatus 13, and can implement a corresponding communications method. Therefore, in this embodiment of the present invention, for descriptions that are of related functions of the first device 1200 and the second device 1400 and that are not provided in detail, refer to descriptions of related embodiments. Details are not described herein again.

In conclusion, in this embodiment of the present invention, the access device generates the temporary identity sequence for the terminal, and sends the first message carrying the temporary identity sequence to the terminal; after receiving the first message sent by the access device, the terminal selects one temporary identity from the temporary identity sequence, and generates, based on an area key of the terminal, the selected temporary identity, and a PDCP data SDU of the terminal, a PDCP data PDU of the terminal, which is used when a V2X message of the terminal is sent, where the area key is an area key of an area corresponding to location information of the terminal. This can implement security requirements of anonymity, non-traceability, and non-repudiation of V2X communication, and reduce security overheads and a processing delay of the V2X communication.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, read-only memory, a flash memory, a hard disk, a solid state drive, a magnetic tape, a floppy disk, an optical disc, or any combination thereof.

The present invention is described with reference to flowcharts and block diagrams of the method and the device in the embodiments of the present invention. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communications method, comprising:
    receiving, by a terminal, a first message sent by an access device, wherein the first message carries a temporary identity sequence generated by the access device for the terminal;
    selecting, by the terminal, one temporary identity from the temporary identity sequence; and
    generating, based on an area key of the terminal, the selected temporary identity, and a packet data convergence protocol (PDCP) data service data unit (SDU) of the terminal, a PDCP data protocol data unit (PDU) of the terminal, wherein the area key is an area key of an area corresponding to location information of the terminal; and, wherein
    the PDCP data PDU comprises a PDCP header, a data payload, and a message authentication code, wherein:
        the PDCP header carries the selected temporary identity, an area identity of the area corresponding to the location information of the terminal, an identity of the area key, and a timestamp at which the terminal processes the PDCP data SDU;
        the data payload is data content of an encrypted PDCP data SDU for V2X communication that needs to be encrypted, and is used to describe state information of the terminal; and
        the message authentication code is obtained by using the area key to perform integrity protection on the PDCP header and the data payload.

2. The method according to claim 1, wherein before the receiving, by the terminal, a first message sent by an access device, the method further comprises:
    sending, by the terminal, a second message to obtain the temporary identity sequence of the terminal to the access device, wherein the second message carries information regarding an identity of the terminal.

3. The method according to claim 2, wherein when the access device is a vehicle to everything (V2X) server, the second message is a temporary identity request message, and the first message is a temporary identity response message.

4. The method according to claim 2, wherein when the access device is a V2X server, the second message is a service authorization request message, and the first message is a service authorization response message.

5. The method according to claim 2, wherein when the access device is a V2X server or an evolved NodeB (eNB), the second message is a communication security parameter request message, and the first message is a communication security parameter response message.

6. The method according to claim 2, wherein when the access device is an eNB, the second message is a radio resource request message, and the first message is a radio resource response message.

7. A communications apparatus, comprising:
    a non-transitory memory storage comprising instructions;
    a hardware processor in communication with the memory storage, wherein the hardware processor executes the instructions;
    a receiver, configured to receive a first message sent by an access device, wherein the first message carries a temporary identity sequence generated by the access device for the apparatus; and
    the processor, configured to: select one temporary identity from the temporary identity sequence; and generate, based on an area key of the apparatus, the selected temporary identity, and a packet data convergence protocol (PDCP) data service data unit (SDU) of the apparatus, a PDCP data protocol data unit (PDU) of the apparatus, wherein the area key is an area key of an area corresponding to location information of the apparatus; and, wherein the PDCP data PDU comprises a PDCP header, a data payload, and a message authentication code, wherein:

the PDCP header carries the selected temporary identity, an area identity of the area corresponding to the location information of the apparatus, an identity of the area key, and a timestamp at which the apparatus processes the PDCP data SDU;

the data payload is data content of an encrypted PDCP data SDU for V2X communication that needs to be encrypted, and is used to describe state information of the apparatus; and the message authentication code is obtained by using the area key to perform integrity protection on the PDCP header and the data payload.

8. The apparatus according to claim 7, wherein before receiving the first message sent by the access device, the receiver is further configured to:

send a second message to obtain the temporary identity sequence of the apparatus to the access device, wherein the second message carries an identity of the apparatus.

9. The apparatus according to claim 8, wherein when the access device is a vehicle to everything (V2X) service unit, the second message is a temporary identity request message, and the first message is a temporary identity response message.

10. The apparatus according to claim 8, wherein when the access device is a V2X service unit, the second message is a service authorization request message, and the first message is a service authorization response message.

11. The apparatus according to claim 8, wherein when the access device is a V2X service unit or an evolved NodeB (eNB), the second message is a communication security parameter request message, and the first message is a communication security parameter response message.

12. The apparatus according to claim 8, wherein when the access device is an eNB, the second message is a radio resource request message, and the first message is a radio resource response message.

13. A computer program product stored in a non-transitory medium, comprising instructions which, when executed by a computer, cause the computer to:

receiving a first message sent by an access device, wherein the first message carries a temporary identity sequence generated by the access device for the terminal; and selecting one temporary identity from the temporary identity sequence, and generating, based on an area key of the terminal, the selected temporary identity, and a packet data convergence protocol (PDCP) data service data unit (SDU) of the terminal, a PDCP data protocol data unit (PDU) of the terminal, wherein the area key is an area key of an area corresponding to location information of the terminal; and, wherein the PDCP data PDU comprises a PDCP header, a data payload, and a message authentication code, wherein:

the PDCP header carries the selected temporary identity, an area identity of the area corresponding to the location information of the apparatus, an identity of the area key, and a timestamp at which the apparatus processes the PDCP data SDU;

the data payload is data content of an encrypted PDCP data SDU for V2X communication that needs to be encrypted, and is used to describe state information of the apparatus; and the message authentication code is obtained by using the area key to perform integrity protection on the PDCP header and the data payload.

* * * * *